US00RE43435E

(19) United States
(12) Reissued Patent
Krause

(10) Patent Number: US RE43,435 E
(45) Date of Reissued Patent: May 29, 2012

(54) FINANCIAL INSTRUMENTS, SYSTEM, AND EXCHANGES (FINANCIAL, STOCK, OPTION AND COMMODITY) BASED UPON REALIZED VOLATILITY

(75) Inventor: Robert P. Krause, Watchung, NJ (US)

(73) Assignee: Volatility Partners, LLC, Gillette, NJ (US)

(21) Appl. No.: 12/724,825

(22) Filed: Mar. 16, 2010

Related U.S. Patent Documents

Reissue of:

(64) Patent No.: 7,328,184
Issued: Feb. 5, 2008
Appl. No.: 09/505,947
Filed: Feb. 15, 2000

(51) Int. Cl.
*G06Q 40/00* (2006.01)

(52) U.S. Cl. ..... 705/37; 705/36 R

(58) Field of Classification Search ..... 705/36 R, 705/37

See application file for complete search history.

(56) References Cited

U.S. PATENT DOCUMENTS

| | | | | |
|---|---|---|---|---|
| 6,263,321 | B1 * | 7/2001 | Daughtery, III | 705/36 R |
| 6,321,212 | B1 * | 11/2001 | Lange | 705/36 R |
| 6,456,982 | B1 * | 9/2002 | Pilipovic | 705/36 R |
| 6,618,707 | B1 * | 9/2003 | Gary | 705/36 R |
| 6,876,982 | B1 * | 4/2005 | Lancaster | 705/37 |

OTHER PUBLICATIONS

Adrangi, Bahram, Chatrath, Arjun. Margin Requirements and Futures Activity: Evidence from the Soybean and Corn Markets, The Journal of Future Markets. Hoboken: Jun. 1999. vol. 19, Iss. 4; p. 433, 23 pgs.*

John E. Kambhu, Dealer's Hedging of Interest Rate Options in the U.S. Dollar Fixed-Income Market, Economic Policy Review—Federal Reserve Bank of New York. New York: Jun. 1998. vol. 4, Iss. 2; p. 35, 23 pgs.*

Shaikh Hamid, Efficient Consolidation of Implied Volatilities and a Test of Intertemporal Averaging, Derivatives Quarterly. New York: Spring 1998. vol. 4, Iss. 3; p. 35, 15 pgs.*

John E. Kambhu, Dealer's Hedging of Interest Rate Options in the U.S. Dollar Fixed-Income Market, Economic Policy Review—Federal Reserve Bank of New York, New York: Jun. 1998. vol. Iss. 2; p. 35, 23 pgs.*

Shaikh Hamid, Efficient Consolidation of Implied Volatilities and a Test of Intertemporal Averaging, Derivatives Quarterly. New York: Spring 1998 vol. 4, Iss. 3; p. 35, 15 pgs.*

* cited by examiner

*Primary Examiner* — Olabode Akintola
(74) *Attorney, Agent, or Firm* — David P. Lentini

(57) ABSTRACT

A financial instrument, exchange, and method based upon the volatility in the price of an underlying. Such volatility contracts have a creation date, a term expiring at an expiration date, and a settlement price at the expiration date defined as "$S_{vol}$", under the formula:

$$S_{vol}=f\{R_{t_1},R_{t_2},R_{t_3},\ldots,R_{t_n}\}, \text{ wherein:}$$

$S_{vol} \geqq 0$, n>1, t=each of a series of observation points from 1 to "n"; $R_t$=return of the underlying based upon each of the observation points in time "$t_n$"; and n=total number of observations within the term. The term is selected from the group consisting of days, months, quarters and years. The settlement price is annualized based upon an approximate total number of periods in a calendar year. $R_t$ is selected from the group consisting of:

$$R_t = \ln\left(\frac{M_t}{M_{t-1}}\right) \text{ and } R_t = \left(\frac{M_t - M_{t-1}}{M_{t-1}}\right)$$

wherein: $M_t$=mark-to-market price at time "t"; and $M_{t-1}$=mark-to-market price at the time immediately prior to time "t", at time "t−1". The settlement price is determined in accordance with the following formula:

$$S_{vol} = \sqrt{\frac{P}{n}\sum_{t=1}^{n} R_t^2} \text{ or } S_{vol} = \sqrt{\frac{P}{n-1}\sum_{t=1}^{n}(R_t - \overline{R})^2}$$

wherein: P=approximate number of trading periods in a calendar year, and each observation point "t" is taken at the same time in each trading period, and $\overline{R}$=mean of all $R_t$'s.

50 Claims, 4 Drawing Sheets

FINANCIAL INSTRUMENTS, SYSTEM, AND EXCHANGES (FINANCIAL, STOCK, OPTION AND COMMODITY) BASED UPON REALIZED VOLATILITY

Matter enclosed in heavy brackets [ ] appears in the original patent but forms no part of this reissue specification; matter printed in italics indicates the additions made by reissue.

FIELD OF THE INVENTION

The present invention relates to the field of financial and negotiable instruments and exchanges that trade in such instruments, and more specifically to standardized financial instruments that are market-priced, purchased and sold, and that settle at a price that is based solely on the volatility of the underlying over a certain predefined period of time.

COPYRIGHT NOTICE

A portion of the disclosure of this patent document contains material which is subject to copyright protection. The copyright owner has no objection to the reproduction by anyone of the patent document or patent disclosure as it appears in the U.S. Patent and Trademark Office files or records for the purposes inherent in U.S. Patent law, but reserves all other rights in connection with duplication and copying.

BACKGROUND OF THE INVENTION

Numerous financial and negotiable instruments exist to facilitate the exchange of goods and services. Others have been created to minimize or exchange risks inherent in underlying transactions. Many have been standardized and trade on regulated exchanges. For example, a promissory note promises the payment of money over a term and is typically employed to facilitate the acquisition of goods. If terms are standardized, then futures and options could be created to assist in transferring the risk in this and similar transactions. By definition, "instruments" provide "formal expression to a legal act or agreement, for the purpose of creating, securing, modifying or terminating a right." See Black's Law Dictionary, West, Revised 4$^{th}$ Edition, 1968.

Once an instrument is created, it can be purchased and sold. Since instruments have a term, one can bargain in the price. The instrument itself can be purchased and sold over time, and one can "observe" a price at any given point in time (if the instrument is standardized and is listed on a regulated or non-regulated exchange). The fluctuations between observations can be measured with a statistical standard deviation formula known as "volatility." The instrument itself can be called an "underlying," when there are instruments that derive their value from it. Volatility is an absolute value, since it is the amount of change, rather than the upward or downward direction of that change.

Volatility between observations can be determined after the observations have occurred. Such historical viewing can provide the data necessary for a calculation of historical volatility. Conceptually, the risks associated with future volatility can be the subject of a bargain, themselves being purchased and sold, and thereby assisting the assumption or minimization of risk. However, prior to the invention herein, there has been no effective standardized mechanism by which a tradable instrument captures the future (realized) volatility of an underlying, in which the instrument has a term, observations during that term, an annualized figure, and wherein final settlement of such an instrument can coincide with the settlement of the options on the underlying.

Risk is a key element in every business and financial decision, and its presence, dictated by the unknown that the future might bring, has been the basis by which the financial markets have prospered. Participants in these markets have been able to reduce or increase their risk by trading instruments that capture price changes in existing markets for such trading. However, participants have heretofore been unable to obtain exposure to changes in the level of that risk by way of standardized instruments.

Contrary to the assumption of popular option-pricing models, changes in market risks can be dramatic. The Bank of International Settlements estimates that $13 trillion of notional over-the-counter ("OTC") option contracts were outstanding as of June 1999—a twenty times increase from six and one-half years ago. While investment banks seek to delta-hedge this exposure, which effectively neutralizes the directional risk (i.e., whether the contract is trading at a higher or lower price), this still leaves behind significant volatility exposure (that is the amount and speed of change). The same concept holds true for option market makers.

Multi-national corporations, looking closely, may find that in addition to directional risk they really have large amounts of volatility risk. Hedge fund managers and commodity trading advisors could easily use a new asset class to base new, uncorrelated trading programs. And, exchanges are always looking for new products that could enhance volume.

Formulas for calculating volatility, and mechanisms for swapping or minimizing volatility have been considered. For example, Brenner, M. and Dan Galai (1989), "New Financial Instruments for Hedging Changes in Volatility," Financial Analysts Journal (July-August), pp. 61-65, proposes a so-called "Sigma Index." Yet, this reference fails to indicate the mechanism for constructing such an index other than by stating that "[i]t could be based on the standard deviation obtained by historical observations (with more weight given to recent observations). It could be based on implied volatilities of options that have just traded. Or we could use a combination of historical and implied volatilities to provide some balance between long and short-run trends." In no manner, does this reference suggest an instrument, nor a means for trading on the basis of realized volatility over a fixed time period.

Likewise, Whaley, R. E. (1993), "Derivatives on Market Volatility: Hedging Tools Long Overdue," Journal of Derivatives (Fall) shows a way that the CBOE could trade options on volatility on the S&P 100. The result of this research was the creation of a so-called "Volatility Index (VIX)." Yet, this index is based upon implied volatility. Implied volatility is derived from an options pricing model using the currently traded option premium to infer (or imply) the market's expectation of the future volatility. Since 1993, while being continuously calculated and quoted, no contracts or instruments have been created or traded on this index.

Neuberger, A. (1994), "The Log Contract," Journal of Portfolio Management (Winter), pp. 74-80, actually teaches away from the instant invention by mentioning (without more) a volatility-type contract, and then dismissing the concept entirely as "inflexible" and "easily manipulated." Instead, this reference proposes trading the Log Contract, which is merely a futures contract based upon calculating the log of the futures price.

Other indices have emerged that further demonstrate a need for the instant invention. The German Futures & Options Exchange (DTB), presented a volatility index similar to the VIX, called the VDAX which is calculated from the implied volatilities of the options on the DAX index. The VDAX began trading on Dec. 5, 1994.

Also, in 1995, The Austrian Futures and Options Exchange (OTOB) announced a volatility index on its Austrian Traded Index (ATX) for calls and puts. In or about 1995, over-the-counter volatility swaps began trading. In November 1996, Volx became the first volatility futures, but it was based on the implied and historical volatility of three European stock indices: FTSE 100, DAX, and Sweden's OMX. In January 1998, Volax, another volatility futures began trading on the 3-month implied volatility of the DAX. None of these attempts at trading volatility have been successful, and they together demonstrate the long felt need in the industry, and huge potential, for a standardized volatility instrument.

In terms of volatility instruments, although the concept of a contract on historical volatility was mentioned in Brenner and Galai [1989] and actual volatility again in Neuberger [1994], no one has heretofore traveled the path of determining and designing an exchange-tradable contract based upon realized volatility. Rather, it would appear that the academic community has focused on implied volatility and will not consider any alternative.

Concepts and theories for derivatives on implied volatility have a pedigree and basis in mathematics and options theory. However, these indices appear useless as a trading vehicle. According to Brenner, M. and Dan Galai (1997), "Options on Volatility," Option-Embedded Bonds, Irwin Publishing, Chapter 13, "[w]hile the concept of interpolating a standardized 30-day, at-the-money option from traded options is simple, the implementation can be quite complicated." Although it is feasible to trade on implied volatility, it is unlikely that such trading would have any serious following. Indeed, no analysis has been performed to determine whether trading on implied volatility would even appeal to market participants, or what they would find useful. For a contract to be successful, it has to be understandable by more than just a few of the most sophisticated players. Unfortunately, few traders will understand all of the math, option theory, averaging, adjustments for weekends, rolling, interpolation, extrapolation, limitations, and assumptions possessed by a contract on implied volatility.

Even if an army of educators descended upon the globe to make sure everyone understood completely the concept of trading on implied volatility, there would nonetheless remain a number of problems.

Problem 1

Settling to Implied Volatility

Suppose an exchange begins trading a futures contract on an index that settles to implied volatility. What would participants be trying to determine? Of course, they would try to forecast the final settlement price. But what is the final settlement price? By definition, the final settlement price is the implied volatility index. But, implied volatility is the market's estimation of future volatility. So, if final settlement is to be an estimate of the future, then what, if anything, could possibly be forecast before the final settlement? The forecast would be of an estimation. In other words, market participants would be trying to guess where the future guess of volatility would be. This causes the participant to guess at a doubly intangible result. The variability in such guesses would demonstrate the stark need for an actual or definite determination. A problem possessed by this and all volatility designed indices prior to the volatility contracts and instruments described herein, has been in trying to make the index a good forecast of future volatility instead of permitting the market to make the forecast and designing the underlying as the item forecasted.

Problem 2

Manipulation

Nueberger [1994] dismisses the mere idea of a contract settling to actual volatility because of the likelihood of market manipulation, and thus teaches away from the invention herein. Arguably, however, it would be immensely easier to manipulate the implied volatility calculation at one specific moment (expiration) than to manipulate the closing futures price over an extended period.

Also, just because there is an ability to manipulate a market does not mean that there would be an advantage, and hence a desire, to do so. Many hedge funds have enough "firepower" to double or triple the price of oats, rough rice, broiler chickens, or just about every option traded on any contract. However, beyond the legal implications, there is no evidence that any such funds would ever attempt such a maneuver because such activity invariably leads to large losses when the opposite, liquidating transaction is performed. Thus, risk of manipulation is not factually supportable.

Neuberger [1994] also assumes that a long volatility trader would seek to "manipulate" the closing price of the underlying in such a way that the calculated volatility would be higher. However, this reference utterly ignores the fact that the short volatility trader, who would have an opposing desire, would then seek to "manipulate" the closing price to be lower. The balance thereby achieved is suggestive of an antithetical conclusion to the one that this reference offers. Instead, the conclusion that is reached is that manipulation, an inherent risk in every market, is no greater or different than when volatility is traded.

Moreover, even if manipulation could be shown to be profitable and legally permissible, the exchanges for trading in such instruments would likely employ countermeasures. For example, the degree of difficulty in manipulating a price series increases in exponential proportion to the number of samples that are taken. Thus, instead of daily settlement readings, exchanges could perform half-day or even hourly readings. Such a significant increase in readings would chill, or more likely fully prevent, any such possibility of manipulation.

Problem 3

Settling to a Continuous X-Day Implied Volatility

Supposedly, one of the main reasons for considering an implied volatility contract was to provide option market makers with a viable hedging vehicle. In this respect, the volatility index methodology fails to achieve that goal. The implied volatility contract's design would effectively hedge this exposure for only one specific day—in the VIX case, 30 days from expiration. The problem here is that the market maker, when delta hedging, has bought or sold implied volatility, but will receive or pay, respectively, actual volatility. Supposedly, the market maker has traded implied volatility and now wants to hedge. His or her needs would now center on hedging actual volatility. The solution as discussed herein is based on realized volatility, so it would be a much better match for this risk.

Problem 4

Attempting to Trade Options on a Contract that has No Underlying Market

An option without a tradable underlying would severely limit market makers' abilities to hedge (as has been contemplated by the CBOE for the VIX). The result would be wider spreads and lower volume, which would yield even wider spreads and lower volume, until the market dies. One could argue that a similar situation exists in the S&P 100 options pit right now (one of the most liquid markets in the world). But this is not entirely correct. There are many other very highly correlated vehicles from which to hedge. Before contemplating options, exchanges must list an underlying. Accordingly, for any volatility instrument to succeed, it, too, must be based upon a listed underlying.

By way of background, U.S. Pat. No. 6,016,483 to Rickard, et al. shows a method and apparatus for automated opening of options exchanges. Formulation and trading of risk management contracts is shown in U.S. Pat. No. 5,970,479 to Shepherd. Analysis of derivative securities is shown in U.S. Pat. No. 5,692,233 to Garman. A game concerning financial futures is shown in U.S. Pat. No. 4,588,192 to Laborde. Negotiable instruments are patentable, as shown by U.S. Pat. No. 6,014,454 to Kunkler (see, e.g., claims 32 through 44).

In short, none of the prior art teaches or suggests the instant volatility instruments disclosed and claimed herein.

It is thus an object of the instant invention to provide standardized, tradable financial instruments for listing on regulated and non-regulated exchanges, based on an underlying, that settle to a calculated value of market return fluctuations over some designated time frame.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

The foregoing objects and other objects of the invention are achieved through a financial instrument (also called a "contract"), exchange, and method based upon the realized volatility in the price of an underlying. Such volatility contracts have a creation date, a term expiring at an expiration date, and a settlement price at the expiration date defined as "$S_{vol}$", in accordance with the formula:

$$S_{vol}=\{R_{t_1},R_{t_2},R_{t_3},\ldots,R_{t_n}\}$$

wherein:

$S_{vol}\geqq 0$ $n>1$ and t=each of a series of observation points from 1 to "n";

$R_t$=return of the underlying based upon each of the observation points in time "$t_n$"; and n=total number of observations within the term.

The term is selected from the group consisting of days, months, quarters and years. The settlement price is annualized based upon an approximate total number of periods in a calendar year. The observation points are taken daily, and approximate total number of periods is selected from the group consisting of 245 to 262, and preferably 252. $R_t$ is selected from the group consisting of:

$$R_t=\ln\left(\frac{M_t}{M_{t-1}}\right)$$

$$R_t=\left(\frac{M_t-M_{t-1}}{M_{t-1}}\right)$$

wherein:

$M_t$=mark-to-market price at time "t"; and $M_{t-1}$=mark-to-market price at the time immediately prior to time "t", at time "t−1"

The settlement price is determined in accordance with the following formula:

$$S_{vol}=\sqrt{\frac{P}{n}\sum_{t=1}^{n}R_t^2}\quad\text{or}\quad S_{vol}=\sqrt{\frac{P}{n-1}\sum_{t=1}^{n}(R_t-\bar{R})^2}$$

wherein:

P=approximate number of trading periods in a calendar year, and each observation point "t" is taken at the same time, and $\bar{R}$=mean of all $R_t$'s.

In accordance with the instant invention, a Volatility Contract ("Vol") has been designed to be an exchange-tradable instrument similar in many ways to a futures contract. (Volatility Contract, Vol Contract, Vol and all combinations, including abbreviations, of associated contracts with a specified time frame are trademarks of Event Capital Management Corp. (www.eventcm.com). Use is by permission only.) However, instead of a contract based on the direction of prices, a Vol is based on the fluctuations of prices, or volatility in prices, over a certain time period. In other words, it is based on the realized or actual volatility that the underlying instrument displays. Trading in the instant instruments will significantly assist market participants in reducing the volatility risks of the underlying. Likewise, it should be appreciated that one of ordinary skill in the art, after comprehending the teachings set forth herein, will well recognize that a Volatility Contract can be created on any market, and that such creation will fall within the spirit and claims of the subject invention.

Vol Contracts are the missing link in the current realm of exchange-traded derivatives. It is generally recognized that futures trade based only on direction of the underlying, while options trade based on both direction and volatility of the underlying. Vol Contracts would trade based purely on volatility. Such Contracts should give rise to a plethora of hedging methods, speculative strategies, and arbitrage opportunities. As shown herein, Vol Contracts overcome the pitfalls in prior attempts to trade volatility. Such prior attempts have been in error in trying to make the underlying predictive, instead of making it the item to be predicted.

In accordance with the invention, a Volatility Contract is an exchange-tradable financial instrument. Volatility Contracts would settle to a calculated value of market return fluctuations over some designated time frame. To quantify these price fluctuations, the invention coins a calculated term known as realized volatility. Realized, historical, actual, and future volatilities all refer to the same concept: the fluctuations in price level of the underlying over a period. The only difference is whether the period occurs in the past (historical volatility), the future (future volatility), or non-specified (realized or actual volatility).

While there can be no perfect way of measuring realized volatility, there nonetheless must be a standard for an exchange-tradable instrument. The final settlement is determined by one of many formulas, some of which have been outlined above. The preferred embodiment is to calculate realized volatility based upon the annualized zero-mean standard deviation of continuously compounded daily price returns. While this method is preferred, other methods of such calculation will fall within the spirit and scope of the claimed invention.

A Vol, therefore, is a regulated or non-regulated exchange-tradable instrument that would settle to the realized volatility of a specific underlying, over a specified period of time, regardless of the exact formula used to measure the volatility or the sampling period employed.

Volatility Contracts in accordance with the subject invention can be based on any underlying. Essentially, if a futures or an option could be traded on an asset or instrument, then a Vol could as well. For example, Bridge/CRB identifies close to 700 active futures markets all over the world. There are presently five equity options exchanges, and about fifty exchanges that trade in options through the world. Volatility Contracts could be made available on any or all of them or on any yet-to-be-listed derivatives market. Also, any listed stock, unlisted stock, physical commodity, physical asset, basket, index, currency, currency swap, treasury instruments, interest rates, market indices and commodities, and the like are all potential candidates.

Exchanges may list just a couple Vol Contracts, initially: a 1-month Vol (Monthly Vol, M-Vol, or $Vol_1$) and a 3-month Vol (Quarterly Vol, Q-Vol, or $Vol_3$). For agricultural products, a 12-month Vol (Annual Vol, A-Vol, $Vol_{12}$) could be added as well. Listing an A-Vol on most financials would not be needed because participants could achieve the same volatility exposure by executing a "strip" of Quarterly Vols (similar to the way Eurodollars are strung together). It would not make sense to "strip" together agricultural products because successive contracts have no mathematical arbitrage between them. Listing of intervening months probably would not be needed and, in fact, may be detrimental to the health of the market.

As stated, Vol is similar to a futures contract, where market participants try to determine the final expiration value during much of its life. During the realized volatility period, the contract's value would become more and more certain as final settlement approaches. Trading a Vol while in the realized volatility period can be considered similar to the manner in which agricultural futures now trade in the delivery month. In other words, the Vol Contract would cease to be a pure anticipatory vehicle during its realized volatility period.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements through the several views.

DETAILED DESCRIPTION OF THE PREFERRED EMBODIMENTS

Figure 1:
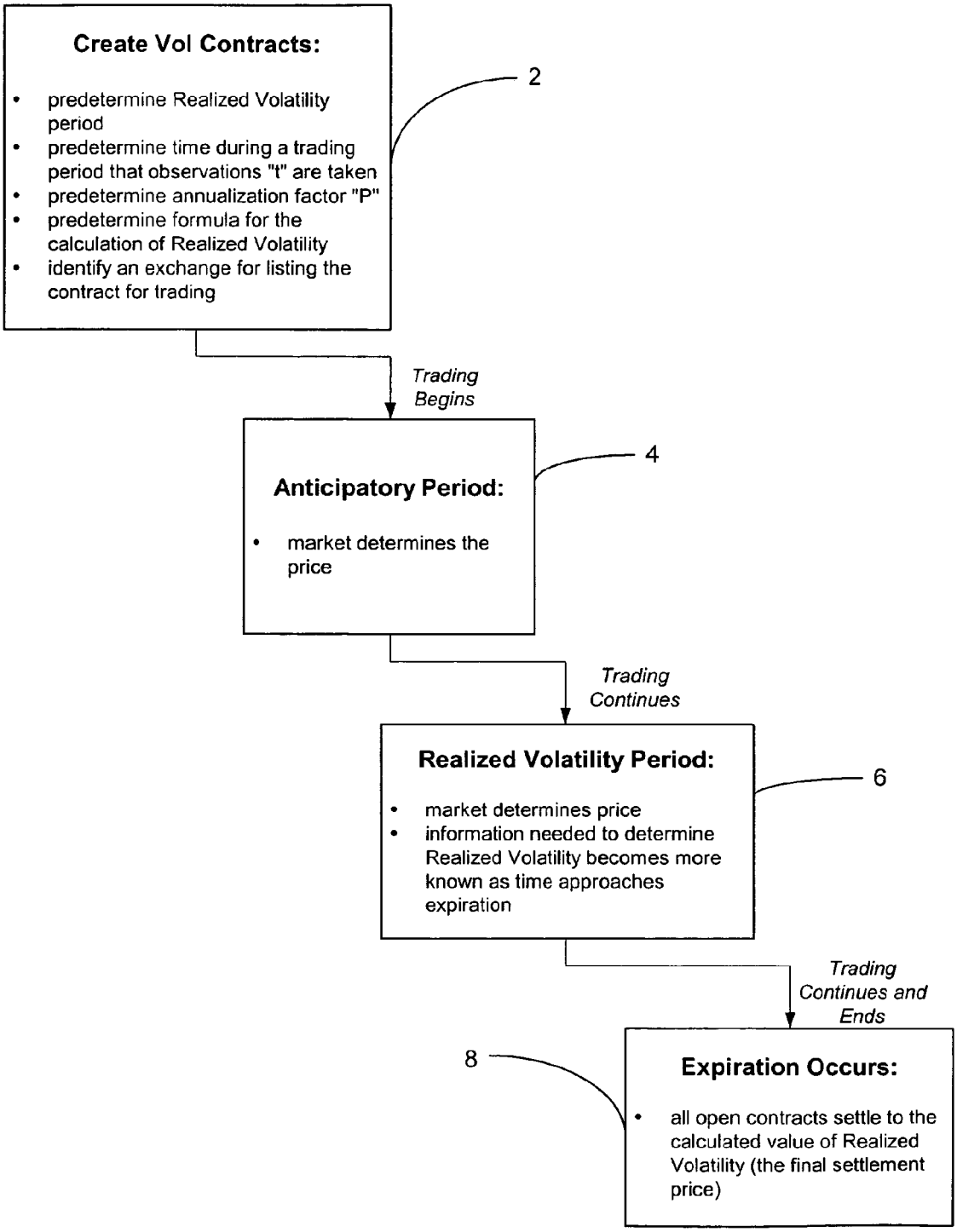
FIG. 1 is a systematic overview of the stages of creation and trading of the financial instrument in accordance with the subject invention.

In accordance with the subject invention, FIG. 1 shows the four key elements of the method and system of the instant invention. In particular, box 2 is directed to the creation of Vol Contracts based upon Realized Volatility, the time during a trading period that observations "t" are taken, an annualization factor "P", a formula for the calculation of Realized Volatility, and an identified exchange for listing the contract for trading. After creation, Vol Contracts are traded on the exchange as shown in box 4, during the anticipatory period, and a price determined by the market. Trading continues during the realized volatility period shown by box 6, during which the market determines the price, and information necessary to determine Realized Volatility becomes more known as the time approaches expiration of the contract. Trading thereafter continues and eventually ends at box 8 when expiration occurs. Upon expiration, all open contracts settle to the calculated value of Realized Volatility. This is the final settlement price for the contract.

Greater comprehension can be had by consideration of the following hypothetical example. Hypothetically, a certain exchange has a cash-settled futures contract on an index that begins trading on January 1. There are the following instruments trading: a December futures, options, and a 3-month Vol that all expire on December 31.

Analysis commences by determining the manner in which these instruments settle. Futures will settle to the index price on the final day of trading. Options will settle to the differential between the strike price and the final settlement price of the underlying futures (or zero if that result is negative). The 3-month Vol will settle to the realized volatility of the underlying (based upon the predetermined formula) for the period from the close on September 30 through the final settlement of the futures on December 31.

Figure 2:
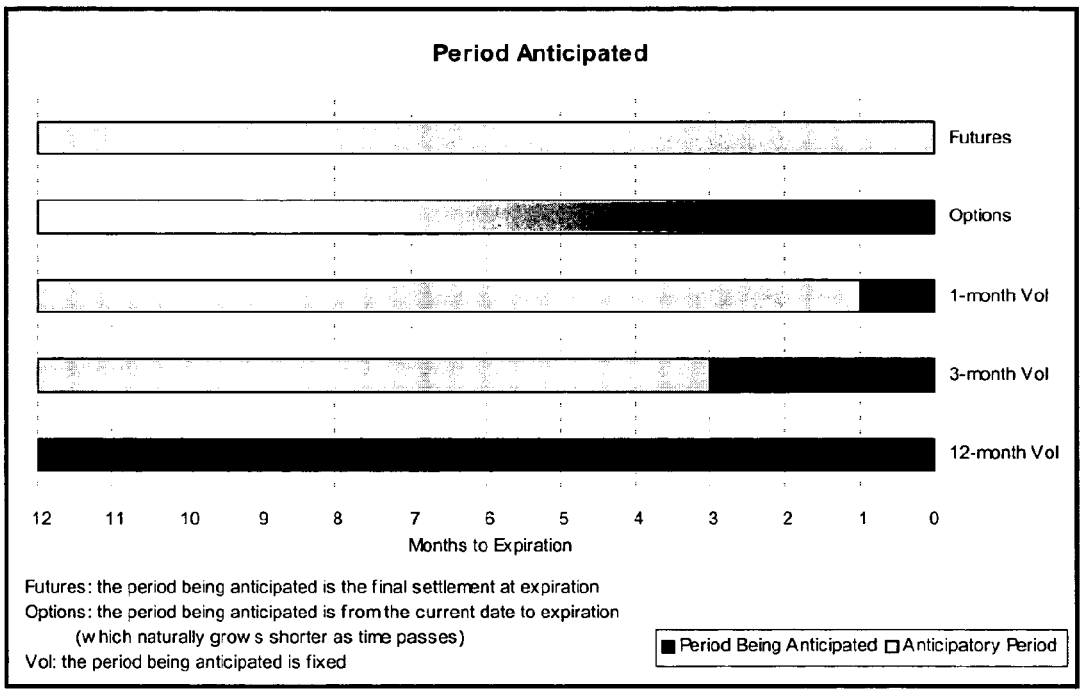
FIG. 2 is a graphical comparison of three volatility contracts having a different term against futures and options.
Figure 3:
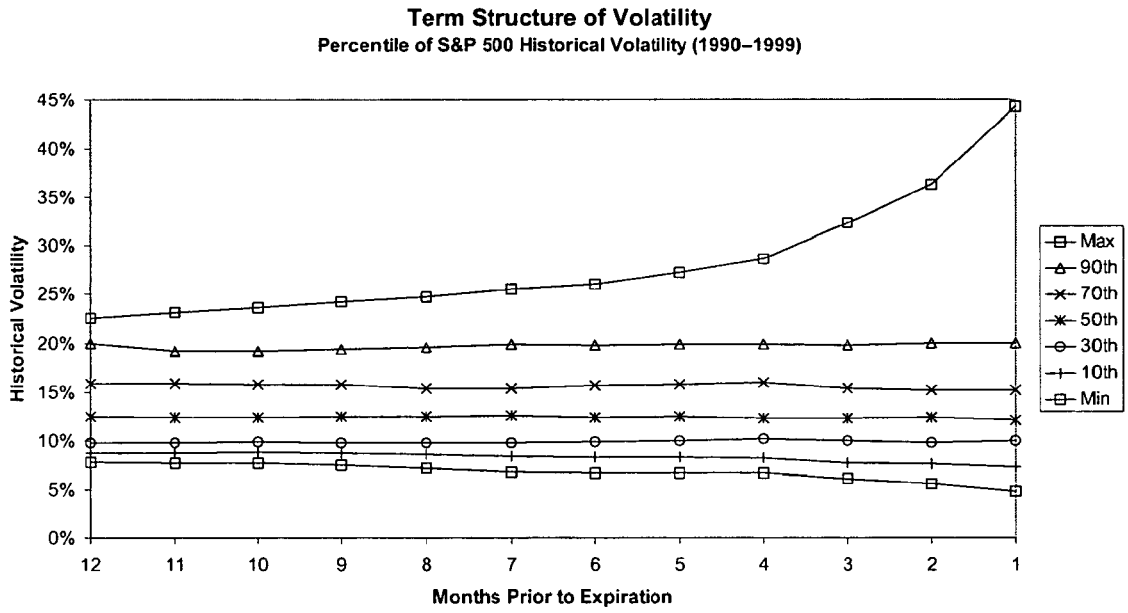
FIG. 3 is a graphical representation of the term structure of volatility.

Next in the analysis is a determination of the manner in which these instruments trade. Reference should be had to the diagram shown in FIG. 2. Throughout the life of the futures contract, the market will be forecasting where the index price will end on December 31. For options, the goal is two-fold: option traders are anticipating the final settlement price (as futures traders are so doing); but also, they are making a forecast on the volatility that the underlying will go on to display from the current moment until expiration. The $Vol_3$ traders will be forecasting the expected volatility of the December futures for the entire fourth quarter. Similar to options, the market will be trying to forecast the exhibited volatility of the underlying in the future. But, unlike options, the time frame being anticipated is fixed. In this case, for the first 9 months, Vol will be a pure anticipatory vehicle. During the last three months of its life, information needed to settle the contract will become more and more known.

Next is a determination of the nature of traders and users of such instruments. Investment banks and option market makers take on large amounts of volatility risk as a by-product of their dynamic process of delta hedging. Delta hedging, also called delta-neutral hedging, is a dynamic process of neutralizing directional market exposure by trading in the underlying according to a schedule determined by an option pricing model. The OTC options market is estimated at $13 trillion (exchange-traded options would be in addition to that figure). While this product is designed for regulated or non-regulated exchanges, much of this OTC option risk should find Vol contracts useful in reducing this volatility risk. Neuberger [1994] stated that " . . . over 80% of the hedging error that remains after delta-hedging is due to an incorrect forecast of the volatility over the life of the option. Delta-hedging reduces hedge errors by a factor of five; volatility hedging could potentially reduce hedge errors by a further factor of five." Assuming the validity of this statement, Volatility Contracts then are necessary, and will likely be quite liquid.

In addition to these hedgers with direct volatility risk, there is a class of hedgers that may find that their business could have problems when volatility changes. The most obvious example would be multi-national corporations. In this case, a foreign exchange rate change may help one part of the company while hurting another. If this is the case, then the real risk is in exchange rates changing, not on the direction of those changes. Definitionally, this is the very volatility captured and traded by the instant Vol Contracts.

Speculator are another group of users. Employment of the instant Vol contracts will provide hedge fund managers and commodity trading advisors with a whole new asset class on which to base trading programs. Individual speculators that now presumably use straddles and strangles to "buy volatility" or "sell volatility" will be able to gain direct volatility exposure.

Full understanding is best had by comparison of Vol Contracts as taught herein to futures and options.

Similarity to Futures

Vol Contracts in accordance with the preferred embodiment of the subject invention are similar to futures contracts in the following ways:

The profit/loss profile is linear (unlike an option);

Settlement is by cash, the same as cash-settled futures;

Market price will change based on supply and demand;

A performance bond will be necessary for both longs and shorts;

The realized volatility period for Vol Contracts and the delivery month for commodities are periods for which both Vol Contracts and futures cease to function as true anticipatory vehicles; and Potentially, one could also trade options on Vol Contracts.

Similarity to Options

Vol Contracts in accordance with the preferred embodiment of the subject invention are similar to options in the following ways:

Each has an underlying;

Exchange-traded Vol Contracts will probably expire at the same time as the options—not necessarily when the underlying futures contract expires (spot, equities, indices, etc. do not expire)—to allow option market makers the closest possible hedging vehicle.

Dissimilarity to Futures

Vol Contracts in accordance with the preferred embodiment of the subject invention, are dissimilar to futures in the following ways:

They do not settle to spot or some index;

The contract value is based on a calculation of the underlying's period price returns over a specific time frame, not just one final price at expiration; and The performance bond might be different for long and short positions.

Dissimilarity to Options

While a standard option's terminal value is based on the underlying's price on the day of expiration, Vol Contract in accordance with the preferred embodiment, are based on the realized volatility of the underlying over many days. In a way, a Vol Contract's expiration value is similar to that of an exotic option known as an Asian option (or Average Rate Option), traded in over-the-counter markets, where the final settlement price is determined by averaging several intermediate settlement prices.

There are no sensitivities—delta, gamma, theta, kappa (vega), rho.

Calculation of Realized Volatility

There are a number of formulas that could be employed to measure the realized volatility associated with a particular underlying, without deviation from the letter and spirit of the subject invention. There are many reasons for both using, and not using, any particular calculation. However, one formula quantifies the annualized standard deviation of continuously compounded returns, as follows:

$$\sqrt{\frac{P}{n-1}\sum_{t=1}^{n}(R_t-\bar{R})^2}$$

Where:

$$R_t = \mathrm{Ln}\left(\frac{M_t}{M_{t-1}}\right)$$

(each $R_t$ is the continuously compounded return for one time period)

Ln=Natural logarithm $M_t$=Mark-to-market price $M_{t-1}$=Mark-to-market price one period prior to the above $\bar{R}$=mean of all $R_t$'s.

n=Number of observations t=An index to count each observation up to the maximum at n P=Number of periods in a year It should be appreciated that observations are taken, and then summed, in accordance with the formula. A standard for the number of periods in a year should be used, and the amount annualized in accordance with industry standards, to allow comparison between contracts of different time frames. Otherwise, confusion would result on the part of investors wondering the exact number of trading days in a year—which could vary depending on the calendar and the number of holidays in a particular country. For example, the Nikkei index trades in Singapore, Chicago, and Japan. Accounting for the time difference, the three should have the same volatility, because they are based on the same index. However, just because of local holiday differences, the index trades a different number of days in each location. Unless a standard period is selected the same contract would settle to different values. Also, it would be a trivial calculation to adjust the results for local differences.

While the foregoing formula may be employed, the preferred formula is different in that it has a zero mean. Demeterfi, K., E. Derman, M. Kamal, and J. Zou (1999), "More Than You Ever Wanted To Know About Volatility Swaps," Quantitative Strategies Research Notes, Goldman Sachs & Co. (March) states "the zero mean is theoretically preferable, because it corresponds most closely to the contract that can be replicated by options portfolios." Applying these principals novelly to the instant invention, if the zero mean is chosen, then the n−1 term becomes just n—because a degree of freedom has been removed.

Also, it does not make logical or intuitive sense to force the statistical measure of standard deviation to conform to the markets. Doing so would imply that the trend exhibited is the "certainty" and that it should be removed, so that the real risk could be measured. For example, if a market rises every day by exactly 1% for one month, the formula above would evaluate the one-month volatility as 0%. If the next month the same market fell by 1% each day, its one-month volatility would be 0%. But, the two-month volatility for this market would be almost 16%! Clearly, zero plus zero should not equal 16. The preferred embodiment is as follows:

$$S_{vol} = \sqrt{\frac{P}{n}\sum_{t=1}^{n} R_t^2}$$

The variables in this formula are as stated hereinabove. The advantages are as stated. Additionally, it should be observed that this formula is simpler, and such simplification would help to promote widespread use.

In terms of design considerations, it should be appreciated that every aspect of Vol's design is directed toward simplicity. A successful market needs speculators, hedgers, and market makers. A contract designed only for hedgers probably will not work. Market makers will not make a "reasonable" market if there is no tradable underlying. Speculators will not trade if they do not understand the rules. It is believed that a successful Vol Contract will make option markets spreads tighter bringing more liquidity to the option market, which would bring more volume to the underlying and then back to the Volatility Contract, thereby benefitting them both.

In terms of the numbers of different types of such volatility contracts, three are preferred. (It should be appreciated that any number or variation may be used without deviation from the spirit or scope of the invention.) It is anticipated that only three Vols need to be listed for each underlying in agriculturals, and two Vols for financials—$Vol_1$, $Vol_3$, and $Vol_{12}$ for agriculturals; $Vol_1$ and $Vol_3$ for financials. Longer-term Vols, such as life of contract, would be of diminished use to hedgers and speculators as time to expiration lengthens. Long-run volatility varies little from its long-run average. Hedgers would not be interested in protecting from such minimal risk; speculators would find little opportunity, for the reasons shown in FIG. 4.

Figure 4:
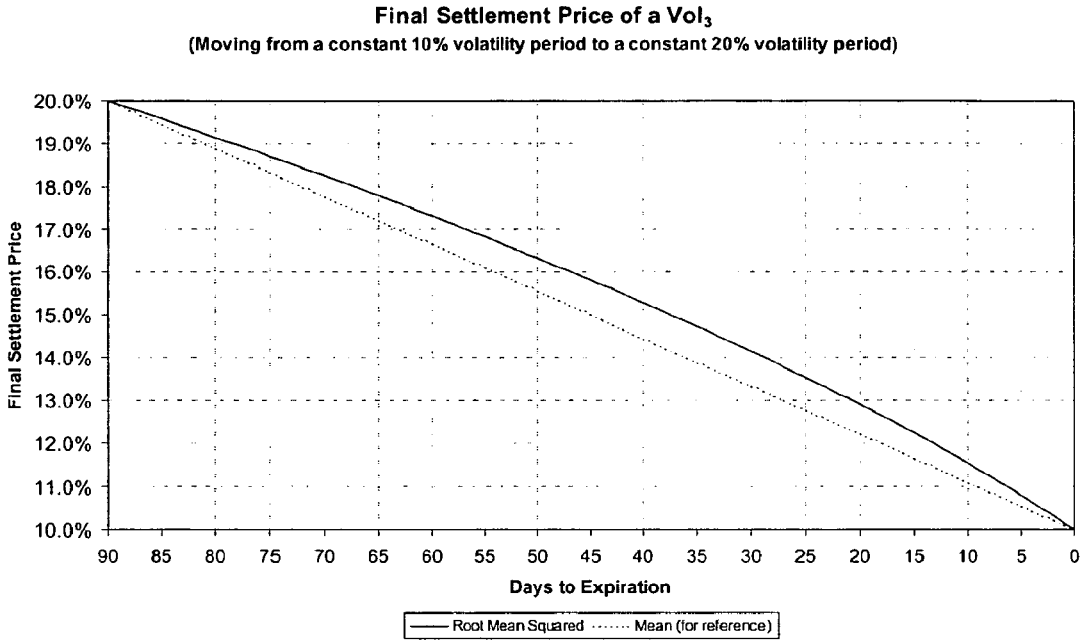
FIG. 4 is a graphical representation showing price differentials based upon root mean squared and mean of volatility contracts.

As shown in FIG. 4, if the variability in volatility is greater the shorter the time to expiration, why not have a 2-week Vol, 1-week Vol, 3-day Vol, 2-day Vol, etc., etc.? Because such additional contracts would not be needed and could actually be detrimental to the health of the market. The reasons are twofold: First, additional contracts could disperse the potential volume, increasing market spreads. Second, shorter-term hedges could be created from longer-term contracts. Take, for instance, a trader wanting to hedge an option sold with 45 calendar days left to expiration. Neither a 1-month Vol (with 15 days to go before the start of the Realized Volatility period) nor 3-month Vol (being 45 days into the Realized Volatility period) appear to be a match. But, $Vol_3$ would actually be a good match. For example, if the first 45 days yielded a realized volatility of 10%, and the next 45 days turns out to be 15%, then the average is 12.5%. One can easily see that trading two contracts would give one the same dollar exposure to an expected increase in volatility. In reality, one would not just simply average the values but use a root mean squared formula. The formula is different, but the concept is the same, as shown in FIG. 5.

Volatility Swaps are gaining momentum in the OTC world. In Demeterfi [1999], the formula is just the realized volatility less the price agreed upon today times a contract multiplier. Vol is nearly as simple. The main differences are in the fixed time period and the standardization of terms. Exchanges have always standardized its products; the OTC world has always customized them. By standardizing, exchanges can concentrate volume into the "best" (most representative) example of the underlying. Of course, Vol will not be able to meet every participant's volatility needs. No single contract could. But, offering two or three Vols would be able to concentrate volume into the most representative examples.

Preferred Vol Contract specifications are as follows:

Contract Size:

Like volatility, Vol is quoted in annual percentage terms. In addition, the contract multiplier should be multiplied by the number of months of the realized volatility period. If, for instance, Japanese yen Q-Vol were last traded at 11.22% (0.1122), and the contract multiplier were $100,000, then this Volatility Contract would be valued at $33,660 ($100,000×0.1122×3 months). If a Japanese yen M-Vol were traded at the same price of 11.22%, then its value would be $11,220 ($100,000×0.1122×1 month). Multiplying by the number of months might aid spreads and arbitrage between the different Volatility Contracts. The contract size would also correspond more closely to the smaller options premiums, as expiration approaches. The month multiplier would add little confusion among participants. Such a design would lead to more potential use by option traders. Also, the variability of volatility is greatest with shorter times. Therefore, longer-term contract can have larger notional values without the threat of tremendous volatility changes.

Because financial products are usually higher in notional amount and lower in average volatility than commodity futures, Vol multipliers will likely be higher for the financials than for commodities. The contract multiplier should be standardized as much as possible to avoid confusion and aid in market acceptance. For instance, all financials might have a contract multiplier of $100,000, all agricultural products $10,000.

Tick Size

The minimum price fluctuation for financials could be 0.01% (0.0001). If the contract multiplier were $100,000, then the minimum tick size would be $10 for an M-Vol and $30 for a Q-Vol. For agricultural markets, the minimum may be 0.05% (0.0005) for M-Vol and Q-Vol. If the contract multiplier were $10,000, then the minimum tick size would be $5 for an M-Vol and $15 for a Q-Vol. An A-Vol could have the same 0.01% minimum as the financial markets, giving it a $12 tick size.

Expiration Date

Same date on which the options on the underlying expire.

Expiration Months 1-month and 3-month Vol would appear to be most useful (also a 12-month Vol for agriculturals). Others would probably not be needed and may actually be detrimental. Sufficient study should be conducted and market demand should be assessed before adding additional time frames.

Settlement

Settlement should be to cash on the calculated value of realized volatility (daily would be the easiest to understand and corresponds to the way most calculate historical volatility. But, hourly could be used if manipulation risk could be proven). Then, hourly probably should only be contemplated for the shortest time frame contracts (hourly reading on a 12-month Vol would be "overkill."

Performance Bond

Because of the potential for extreme moves in volatility, the performance bond in percentage terms should be higher than for futures contracts in general. Also, it may be prudent to charge different performance bond levels depending on whether the market participant is long or short (options have such a long/short differential).

Initial Listing

The Vol contract should be listed when the underlying futures or options are listed.

By way of a hypothetical, Table I, appended hereto, shows trading and calculation of a Vol in accordance with the preferred embodiment of the invention.

In summary, a Volatility Contract has been designed to be an exchange-tradable instrument based on volatility. It can be created on any instrument with linear characteristics (e.g., futures, stock, index, currency, etc.). It will provide a way for market participants to speculate on, or hedge against, changes in perceived market risk (volatility).

The Volatility Contracts will trade in a manner similar to a futures contract in that market participants will be trying to forecast a future value. Unlike futures contracts, though, a Vol will settle to a calculated value of an underlying over some predetermined time frame (called the Realized Volatility period), as opposed to just the value at the end of the period. A Vol will settle to the underlying's realized volatility. It should expire when the corresponding options expire.

Unlike current futures contracts that have differing contract multipliers, perhaps the contract multiplier of a Vol would be most successful being standardized among groups of financials and commodities—$100,000×Volatility×Number of months for financials; $10,000×Volatility×Number of months for agriculturals. Similarly, the formula to calculate realized volatility should also be standardized. Doing so would ensure the greatest acceptance and participation with the least confusion among the trading community.

An index of volatility that incorporates Implied Volatility has many drawbacks. It could be easily manipulated. It appears to have been designed with only market makers in mind—but fails to accommodate them. It requires market participants to estimate a future estimation—an intangible result. Previous attempts have tried to list options before a liquid, tradable underlying was available. All of these problems are solved with the Vol as taught herein, which, in addition, should appeal to a broader array of market participants.

Currently, investment banks and market makers have significant volatility exposure with no acceptable method of hedging. Vol, as taught herein, will finally allow for a very good hedge, although, not an exactly arbitrageable, one-for-one match (possibly on the order of a five-fold reduction in risk or more). This instrument opens up an entirely new asset class for professional asset managers and speculators.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A computer implemented method for the creation and trading of financial instruments based upon the volatility of an underlying comprising the following steps:

(a) creating at least one volatility contract for a predetermined term *by a computer*, [with] *said at least one volatility contract having* a predetermined formula for settlement price based on a realized formula, selected from the group consisting of:

$$S_{vol} = \sqrt{\frac{P}{n-1}\sum_{t=1}^{n}(R_t - \bar{R})^2} \tag{1}$$

wherein:

P=approximate number of trading periods in a calendar year, and each observation point "t" is taken at the same time in each trading period; and $\bar{R}$=*the* mean of all $R_t$'s;

$$S_{vol} = \sqrt{\frac{P_{hl}}{n}\sum_{t=1}^{n}\left(\ln\frac{h_t}{l_t}\right)^2} \tag{2}$$

wherein:

$P_{h1}$=total number of trading periods in a year wherein two observations points "$h_t$" and "$l_t$" are used, and "$h_t$" is the high price point and "$l_t$" the low price point for each such trading period in that year; and $R_t=f\{h_t, l_t\}$; and $$S_{vol} = \sqrt{\frac{P_{ohlc}}{n}\sum_{t=1}^{n}\left[\frac{1}{2}\left(\ln\frac{h_t}{l_t}\right)^2 - (2\ln(2)-1)\left(\ln\frac{c_t}{o_t}\right)^2\right]} \tag{3}$$

wherein:

$P_{ohlc}$=total number of trading periods, wherein four observation points "$h_t$", "$l_t$", "$c_t$" and "$o_t$" are used, and "$h_t$" is the high price point, "$l_t$" the low price point, "$c_t$" is the closing, last, or daily settlement price, and "$o_t$" the opening price for each such trading period;

$R_t=f\{h_t, l_t, c_t, o_t\}$; and $$S_{vol} = \sqrt{\frac{P}{n}\sum_{t=1}^{n}R_t^2} \tag{4}$$

wherein:

P=approximate number of trading periods in a calendar year, and each observation point "t" is taken at the same time in each trading period; and n=total number of observations within the term; and $R_t$=return of the underlying based upon each of the observation points in time "$t_n$"; *and*

(b) trading the at least one volatility contract at market-determined prices from creation through the date of expiration.

*2. The method of claim 1, further including setting an approximate one-month expiration for said volatility contract.*

*3. The method of claim 1, further including setting an approximate three-month expiration for said volatility contract.*

*4. The method of claim 1, further including setting an approximate 12-month expiration for said volatility contract.*

*5. The method of claim 1, wherein*

$$S_{vol} = \sqrt{\frac{P}{n}\sum_{t=1}^{n} R_t^2}$$

*and further wherein P is the approximate number of trading periods in a calendar year, and each observation point t is taken at the same time in each trading period; n is the total number of observations within the term; and $R_t$ is the return of the underlying based upon each of the observation points in time $t_n$.*

*6. The method of claim 5, wherein said number of trading periods in a calendar year is standardized.*

*7. The method of claim 6, further including setting an approximate one-month expiration for said volatility contract.*

*8. The method of claim 6, further including setting an approximate three-month expiration for said volatility contract.*

*9. The method of claim 6, further including setting an approximate 12-month expiration for said volatility contract.*

*10. A computer-implemented method for the creation and trading of financial instruments based upon the volatility of an underlying, comprising the following steps:*

*(a) creating a volatility contract for a predetermined term using a computer, said computer computing a settlement price based on a realized formula for said volatility contract selected from the group consisting of:*

$$S_{vol} = \sqrt{\frac{P}{n-1}\sum_{t=1}^{n} (R_t - \overline{R})^2} \tag{1}$$

*wherein P=approximate number of trading periods in a calendar year, and each observation point "t" is taken at the same time in each trading period; and $\overline{R}$=mean of all $R_t$'s;*

$$S_{vol} = \sqrt{\frac{P_{hl}}{n}\sum_{t=1}^{n}\left(ln\frac{h_t}{l_t}\right)^2} \tag{2}$$

*wherein $P_{hl}$=total number of trading periods in a year, wherein two observation points "$h_t$" and "$l_t$" are used, and "$h_t$" is the high price point and "$l_t$" the low price point for each such trading period in that year; and $R_t=f(h_t, l_t)$; and*

$$S_{vol} = \sqrt{\frac{P_{ohlc}}{n}\sum_{t=1}^{n}\left[\frac{1}{2}\left(ln\frac{h_t}{l_t}\right)^2 - (2ln(2)-1)\left(ln\frac{c_t}{o_t}\right)^2\right]} \tag{3}$$

*wherein $P_{ohlc}$=total number of trading periods, wherein four observation points "$h_t$", "$l_t$", "$c_t$" and "$o_t$" are used, and "$h_t$" is the high price point, "$l_t$" the low price point, "$c_t$" is the closing, last, or daily settlement price, and "$o_t$" the opening price for each such trading period; $R_t=f(h_t, l_t, c_t, o_t)$; and*

$$S_{vol} = \sqrt{\frac{P}{n}\sum_{t=1}^{n} R_t^2} \tag{4}$$

*wherein P=approximate number of trading periods in a calendar year, and each observation point "t" is taken at the same time in each trading period; and*
*n=total number of observations within the term; and*
*$R_t$=return of the underlying based upon each of the observation points in time "$t_n$"; and*

*(b) trading the created volatility contract at market-determined prices from creation through the date of expiration.*

*11. The method of claim 10, wherein said number of trading periods in a calendar year is standardized.*

*12. The method of claim 11, further including computing said settlement price using a one-month expiration for said volatility contract.*

*13. The method of claim 11, further including computing said settlement price using a three-month expiration for said volatility contract.*

*14. The method of claim 11, further including computing said settlement price using a 12-month expiration for said volatility contract.*

*15. The method of claim 10, further including computing said settlement price using a one-month expiration for said volatility contract.*

*16. The method of claim 10, further including computing said settlement price using a three-month expiration for said volatility contract.*

*17. The method of claim 10, further including computing said settlement price using a 12-month expiration for said volatility contract.*

*18. The method of claim 10, wherein*

$$S_{vol} = \sqrt{\frac{P}{n}\sum_{t=1}^{n} R_t^2}$$

*and further wherein P is the approximate number of trading periods in a calendar year, and each observation point t is taken at the same time in each trading period; n is the total number of observations within the term; and $R_t$ is the return of the underlying based upon each of the observation points in time $t_n$.*

*19. The method of claim 18, wherein said number of trading periods in a calendar year is standardized.*

*20. The method of claim 19, further including computing said settlement price using a one-month expiration for said volatility contract.*

21. The method of claim 19, further including computing said settlement price using a three-month expiration for said volatility contract.

22. The method of claim 19, further including computing said settlement price using a 12-month expiration for said volatility contract.

23. The method of claim 18, further including computing said settlement price using a one-month expiration for said volatility contract.

24. The method of claim 18, further including computing said settlement price using a three-month expiration for said volatility contract.

25. The method of claim 18, further including computing said settlement price using a 12-month expiration for said volatility contract.

26. A computer-implemented method for the creation and trading of financial instruments based upon the volatility of an underlying, comprising:

(a) providing data for creating at least one volatility contract for a predetermined term in computer memory accessible to a computer data processor, said data having been generated using a predetermined formula for settlement price based on a realized formula selected from the group consisting of:

$$S_{vol} = \sqrt{\frac{P}{n-1}\sum_{t=1}^{n}(R_t - \overline{R})^2} \tag{1}$$

wherein P=is the approximate number of trading periods in a calendar year, and each observation point "t" is taken at the same time in each trading period; and $\overline{R}$=mean of all $R_t$'s;

$$S_{vol} = \sqrt{\frac{P_{hl}}{n}\sum_{t=1}^{n}\left(ln\frac{h_t}{l_t}\right)^2} \tag{2}$$

wherein $P_{hl}$=total number of trading periods in a year, wherein two observation points "$h_t$" and "$l_t$" are used, and "$h_t$" is the high price point and "$l_t$" the low price point for each such trading period in that year, and $R_t=f(h_t, l_t)$; and $$S_{vol} = \sqrt{\frac{P_{ohlc}}{n}\sum_{t=1}^{n}\left[\frac{1}{2}\left(ln\frac{h_t}{l_t}\right)^2 - (2ln(2)-1)\left(ln\frac{c_t}{o_t}\right)^2\right]} \tag{3}$$

wherein $P_{ohlc}$=total number of trading periods, wherein four observation points "$h_t$", "$l_t$", "$c_t$" and "$o_t$" are used, and "$h_t$" is the high price point, "$l_t$" the low price point, "$c_t$" is the closing, last, or daily settlement price, and $o_t$ the opening price for each such trading period; and $R_t=f(h_t, l_t, c_t, o_t)$; and $$S_{vol} = \sqrt{\frac{P}{n}\sum_{t=1}^{n}R_t^2} \tag{4}$$

wherein P=approximate number of trading periods in a calendar year, and each observation point "t" is taken at the same time in each trading period;

n=total number of observations within the term; and $R_t$=return of the underlying based upon each of the observation points in time "$t_n$"; and (b) creating by said computer data processor at least one volatility contract based on said provided data; and (c) trading the at least one volatility contract at market-determined prices from creation through the date of expiration.

27. The method of claim 26, wherein said number of trading periods in a calendar year is standardized.

28. The method of claim 27, further including computing said settlement price using a one-month expiration for said volatility contract.

29. The method of claim 27, further including computing said settlement price using a three-month expiration for said volatility contract.

30. The method of claim 27, further including computing said settlement price using a 12-month expiration for said volatility contract.

31. The method of claim 26, further including computing said settlement price using a one-month expiration for said volatility contract.

32. The method of claim 26, further including computing said settlement price using a three-month expiration for said volatility contract.

33. The method of claim 26, further including computing said settlement price using a 12-month expiration for said volatility contract.

34. The method of claim 26, wherein $$S_{vol} = \sqrt{\frac{P}{n}\sum_{t=1}^{n}R_t^2}$$

and further wherein P is the approximate number of trading periods in a calendar year, and each observation point t is taken at the same time in each trading period; n is the total number of observations within the term; and $R_t$ is the return of the underlying based upon each of the observation points in time $t_n$.

35. The method of claim 34, wherein said number of trading periods in a calendar year is standardized.

36. The method of claim 35, further including computing said settlement price using a one-month expiration for said volatility contract.

37. The method of claim 35, further including computing said settlement price using a three-month expiration for said volatility contract.

38. The method of claim 35, further including computing said settlement price using a 12-month expiration for said volatility contract.

39. The method of claim 34, further including computing said settlement price using a one-month expiration for said volatility contract.

40. The method of claim 34, further including computing said settlement price using a three-month expiration for said volatility contract.

41. The method of claim 34, further including computing said settlement price using a 12-month expiration for said volatility contract.

42. The method of claim 26, further comprising determining a standardized contract multiplier.

43. The method of claim 42, wherein said contract multiplier is standardized among groups of financials or standardized among groups of commodities.

44. The method of claim 43, wherein said contract multiplier is standardized among groups of financials.

*45. The method of claim 44, wherein said standardized contract multiplier is determined according to the formula:*

$*100,000×Volatility×Number of Months.*

*46. The method of claim 43, wherein said contract multiplier is standardized among groups of financials.*

*47. The method of claim 46, wherein said standardized contract multiplier is determined according to the formula:*

$*100,000×Volatility×Number of Months.*

*48. The method of claim 26, further comprising choosing a standardized formula to calculate realized volatility.*

*49. The method of claim 48, wherein said standardized formula is selected from one of said predetermined formulas for settlement price.*

*50. The method of claim 26, further comprising trading said volatility contract on an exchange.*

* * * * *